July 13, 1965  E. A. BECK  3,195,138
RADOME WITH PARTICULAR APEX AND WALL STRUCTURE
Filed Dec. 26, 1963
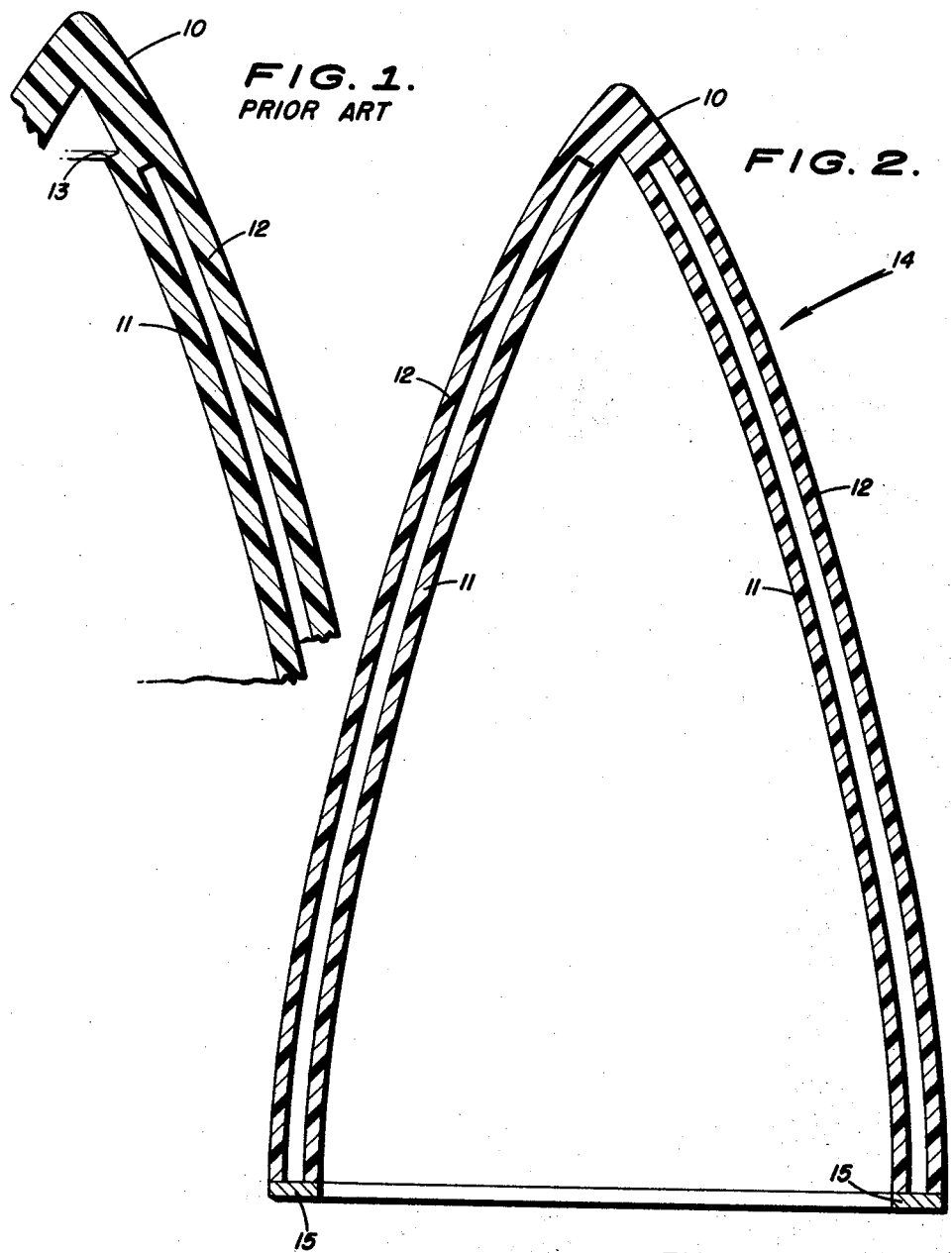
EMANUEL A. BECK
INVENTOR.
BY
Claude Funkhouser
ATTORNEY 3,195,138
Patented July 13, 1965

3,195,138
RADOME WITH PARTICULAR APEX AND WALL STRUCTURE
Emanuel A. Beck, Silver Spring, Md., assignor to the United States of America as represented by the Secretary of the Navy
Filed Dec. 26, 1963, Ser. No. 333,776
4 Claims. (Cl. 343—872)

The present invention relates in general to radomes and more particularly to a streamlined radome structure having improved electrical characteristics.

In various types of aircraft and missiles carrying radar equipment, an antenna is mounted in the nose of the craft and is covered with an appropriate aerodynamic surface or radome. A radome must be constructed of material which is strong enough to withstand the aerodynamic forces to which it may be subjected, and yet must be relatively distortion free and transparent to radar energy. Radomes are made from suitable dielectric materials such as alumina, glass reinforced lamina, or ceramic materials, and are generally projectile shaped for aerodynamic streamlining. A streamlined radome shape introduces errors into the system due to the refractive characteristic of the electromagnetic energy in passing from one medium to another. If the radome shape could be made hemispherical, no error would exist since the radar signals would see the same path characteristics for any viewing or look angle. In high speed craft, however, the radome must be streamlined for aerodynamic considerations, and every look angle causes a different amount of deflection of the radar beam.

Another source of errors in the system is the variation in the wall thickness of the radome because of structural and weight limitations. These variations causes impedance discontinuities which affect the propagation of the radar beam. These extraneous electrical characteristics which the radome introduces into the tracking operation create a most difficult design aspect of the system.

It is an object of the present invention to provide a streamlined radome having improved electrical characteristics without an accompanying loss of structural strength.

Another object of the present invention is to provide a radome with a sandwich-like or layered sidewall to produce a minimal refractive error.

It is another object of the present invention to provide a projectile shaped radome having smooth electrical and mechanical transitions between the solid apex section and the sidewalls thereof.

Other objects and many of the attendant advantages of this invention will be readily appreciated as the same becomes better understood by reference to the following detailed description when considered in connection with the accompanying drawings, wherein:

FIG. 1 is a sectional view of a portion of a prior art radome; and

FIG. 2 is a sectional view of a radome constructed in accordance with the teachings of the present invention.

The design of a radome requires a consideration of its structural strength and weight as well as its electromagnetic characteristics. The strength and weight factors are counterbalancing, and the improvement of one of these factors generally results in the degradation of the other. FIG. 1 illustrates a typical prior art radome having a nose or apex section 10 and a sidewall section formed of walls 11 and 12 with an airspace between. The apex section 10 is formed of a solid wall to provide maximum structural strength in the region which is subjected to the maximum aerodynamic forces.

Prior art radomes, such as shown in FIG. 1, are constructed to maintain a uniform amount of dielectric material between a radar scanner within the radome and a target. To this end, each of the walls 11 and 12 is made one-half of the thickness of the apex section 10. This expedient, however, results in a step 13 having a depth equal to the width of the airspace between the walls 11 and 12. While this prior art construction minimizes the errors in the system due to refraction of the beam and provides adequate strength, the step 13 produces an electrical discontinuity to the radar beam.

FIG. 2 illustrates a radome constructed in accordance with the teachings of the present invention in which the above-mentioned deficiencies are overcome. The radome has an apex section 10 of sufficient thickness to provide the necessary structural rigidity in this region. Wall sections 11 and 12 are spaced from each other and depend from the apex section 10 in a sandwich configuration to form the sidewall 14 of the radome. The corresponding inner ends of the wall sections 11 and 12 are connected by an annular web 15. The overall thickness of the sidewall 14 is made exactly equal to the thickness of the apex section 10, eliminating the step 13 and providing a smooth transition between the apex 10 and the sidewall on both the interior and exterior surfaces of the radome. This is accomplished by reducing the thickness of each of the wall sections 11 and 12. This reduction in wall thickness, coupled with the reduction of the overall sidewall dimension, provides substantially the same refractive qualities as the prior art radomes.

In addition to the improvement in the electrical characteristics of the radome, a large weight saving is accomplished by smoothing the surface of the inner wall 11 and still providing adequate structural strength.

Obviously, many modifications and variations of the present invention are possible in the light of the above teachings. It is therefore to be understood that within the scope of the appended claims the invention may be practiced otherwise than as specifically described.

What is claimed is:
1. A projectile shaped radome comprising,
a solid apex portion,
a sidewall depending from said apex portion, said sidewall being formed of two wall sections arranged in a sandwich configuration, said sidewall having the same overall thickness as said apex portion, whereby the inner and outer surfaces of the radome are smooth.
2. The radome of claim 1 in which each of said wall sections are substantially thinner than said apex portion.
3. A streamlined radome comprising,
a solid apex portion of dielectric material,
a sidewall depending from said apex portion, said sidewall being formed of two curved wall sections of dielectric material arranged in a sandwich configuration, and enclosing an airspace,
the region in which said sidewall joins said apex portion being smooth, whereby the radome presents a uniform impedance to electrical waves transmitted therethrough.
4. The radome of claim 3, further including an annular web attached to said sidewall, said web sealing said airspace between said wall sections.

No references cited.

HERMAN KARL SAALBACH, *Primary Examiner.*